Dec. 4, 1973 W. N. KHAN 3,776,818

COVER ELEMENT DISC DISPENSER

Filed June 19, 1970 2 Sheets-Sheet 1

INVENTOR
WAHEED N. KHAN

COVER ELEMENT DISC DISPENSER

Filed June 19, 1970 2 Sheets-Sheet 2

INVENTOR
WAHEED N. KHAN

United States Patent Office 3,776,818

Patented Dec. 4, 1973

3,776,818

COVER ELEMENT DISC DISPENSER

Waheed N. Khan, 1703 East-West Highway, 503, Silver Spring, Md. 20910

Filed June 19, 1970, Ser. No. 47,675
Int. Cl. C12k *1/10*
U.S. Cl. 195—139 14 Claims

ABSTRACT OF THE DISCLOSURE

A disc dispenser for use in microbiological techniques such as antibiotic sensitivity testing is provided by adding to the conventional petri dish a cover element having means for holding paper discs in a predetermined pattern. The discs may be accurately deposited onto media contained in the dish by removing the lid and cover element, replacing the cover element of the invention, and inverting the assembly to allow the discs to fall into place. Discs are thereby positioned accurately without the need of an elaborate dispensing device.

BACKGROUND OF THE INVENTION

Field of the invention

The present invention relates generally to an improved method and apparatus for accurately depositing particulate discs in a predetermined pattern onto a solid or semi-solid base. More particularly, the present invention relates to a method and apparatus for accurately depositing anti-bacterial-impregnated sensitivity discs in a predetermined pattern onto a pre-inoculated microbiological culture media.

Description of the prior art

Many standard diagnostic laboratory tests involve depositing reagent-containing discs onto gel layers containing test specimens capable of reacting with the reagent contained in the disc. The test specimen may be a chemical, microorganisms, virus, etc. When the reagent has been allowed to diffuse from the disc into the gel layer, various reactions may occur in the localized area surrounding the disc into which the reagent has diffused. Specific examples familiar to those in the art include antibiotic sensitivity testing and the various precipitin reactions. In one example of the former, test discs which have been impregnated with controlled amounts of various anti-bacterial agents, are deposited onto pre-inoculated gel culture media which may then be refrigerated for a period of time sufficient to allow diffusion of the agents into the media. Upon incubation of the media under conditions appropriate to the known or suspected test specimen, a zone of inhibition will appear around the disc which contains anti-bacterial agents to which the test specimen is susceptible, thus aiding in the selection of proper agents suitable for inhibiting growth of the test specimen.

A variation of the above technique may be used to determine which of various reagents will accelerate growth on the particular media being used, in which case zones of rapid growth rather than zones of growth inhibition appear around the appropriate discs.

Other tests utilizing the same basic diffusion technique deposit discs impregnated with reagents which will react by forming a precipitate with the other reagents contained in the testing media, such as various immunoprecipitin tests.

In the past, various practices have been used to deposit reagents onto gel layers. One such practice has been hand placing single reagent discs onto gel surfaces using tweezers. This procedure is repetitive and time-consuming, increasing chances of contamination. Furthermore, it is practically impossible to obtain optimal uniform spacing by hand placement of individual discs on a large number of plates.

A common practice in various immunoprecipitin tests has been to cut wells into the gel, which are then used to hold liquids containing suitable reagents. This method has the disadvantage of frequent mechanical rupturing of the gel surface, particularly where the wells are small or closely spaced. This results in either releasing the reagent from the well or distorting the homogeneity of the gel layer; in either event, the test may be ruined.

By far the most common methods for placing impregnated discs onto a gel layer for antibiotic sensitivity testing have involved magazine dispensing units which by various mechanically complicated mechanisms generally provide accurate and reproduceable placement of reagent discs onto a suitable gel surface. Such dispensing devices are expensive and, having precision movable parts and being subjected to repeated use, often go out of adjustment, resulting in irregular deposition of the reagent discs. It is accepted laboratory practice to incubate the plates in an inverted position (i.e., with the bottom plate containing the gel inverted and resting on top of the inverted lid) in order to avoid anomolous results due to moisture condensation. Since commercially available sensitivity discs are relatively dry and will not retain contact with the dry gel surface, each deposited disc must be individually pressed into the gel surface by sterile forceps or the like to insure its adherence to the gel when the plate is inverted for incubation.

A further disadvantage of such mechanical dispensers is that the laboratory must keep on hand a magazine for each particular antibacterial reagent disc if the advantages of a dispenser are to be fully realized. Since there are several dozen such discs having common antibacterial agents impregnated in various dosages, this often represents an investment of several hundred dollars worth of discs, many of which may never be used before their expiration date. This is burdensome on a small office or laboratory, and as a result many technicians who would otherwise perform these tests themselves do not do so.

While both the gel media and the reagent discs should be kept refrigerated prior to use to retain their maximum activity, there is a tendency to leave dispensers containing magazines of reagent discs sitting out unrefrigerated due to lack of space or poor laboratory technique, and the reagent discs lose their activity more rapidly than if they were kept refrigerated.

Yet another problem with the dispensers known in the art is the danger of contamination resulting from accidental tipping of the dispenser. Since the dispenser itself is not sterile, any contact between it and the gel media is likely to introduce contamination which will cloud the results of the sensitivity test.

SUMMARY OF THE INVENTION

It is, therefore, the general purpose of this invention to provide a method and apparatus having all of the advantages of similarly employed prior art methods and devices with none of the above described disadvantages for accurately depositing particulate discs in a predetermined pattern onto a solid or semi-solid base.

It is an object of this invention to provide a method and apparatus having no moving parts for depositing particulate discs in a predetermined pattern onto a solid or semi-solid base.

Another object of this invention is to provide a means for embedding said particulate discs into the surface of said base without introducing any foreign elements into the enclosure.

A further object of this invention is to provide a sterile, pre-packaged article of manufacture which contains the necessary elements for performing antibacterial agent sensitivity testing in a single package.

Still another object is to provide a cover element which may be used in combination with standard receptacles such as petri dishes to deposit reagent discs thereon.

The foregoing and other objects are attained in accordance with the present invention which provides a unique cover element for a corresponding receptacle such as a petri dish. A spacing means and the cover element keep the discs out of contact with the media surface prior to use. The cover element has means for maintaining the reagent discs in the desired pattern, thereby preventing movement of the discs outside the desired pattern.

Since, as previously mentioned, most media-containing petri dishes are stored with the gel layer upward to avoid water condensation on the gel surface contained in the bottom plate, to place the discs simultaneously on the gel layer, this plate is lifted and the lid lying immediately below it is removed. The gel-containing bottom plate is put back into place over the cover element of the invention, and inversion of the two while held together, followed if necessary by a slight tap, causes the reagent discs to drop into position on the gel layer. If desired, the discs may then be embedded into the surface of the gel by lifting the cover element, rotating it slightly so that the projecting means which previously surrounded the discs are now over the discs, and setting it back down against the disc. The plate may then be immediately incubated, or the cover element of the invention may be replaced by the petri dish lid, since either will form a suitable seal with the bottom plate.

As can be seen from the foregoing, the present invention eliminates the requirement for any outside equipment to deposit and subsequently embed reagent discs onto the gel surface of a receptacle. The entire apparatus may be prepackaged in sterile condition, thereby considerably lessening chances of a contamination.

BRIEF DESCRIPTION OF THE DRAWINGS

These and other objects, features and advantages of the invention will become more fully apparent to those skilled in the art from the following description of an illustrative embodiment of the invention, as shown in the annexed drawings, wherein like reference numerals designate corresponding parts throughout the several figures, and in which.

DESCRIPTION OF AN ILLUSTRATIVE EMBODIMENT

Figure 1:
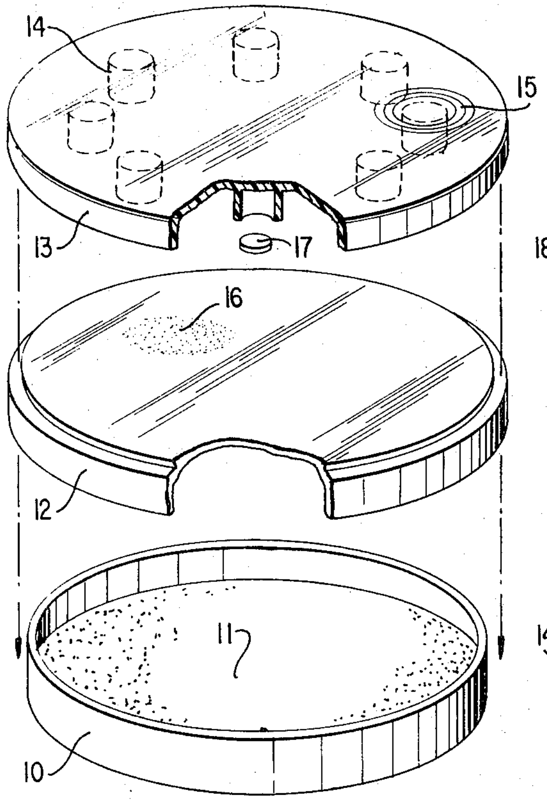
FIG. 1 is an exploded perspective view of the cover element of the invention in combination with a standard petri dish and lid.

Referring now to FIG. 1, the standard microbiological petri dish is composed of a bottom plate 10 of any suitable size, usually up to 150 mm. in diameter, containing a suitable culture media 11 and a lid 12. Media most commonly used in antibacterial sensitivity testing include Blood Agar, Eugonagar, Trypticase Soy Agar, and Mueller-Hinton Agar, but any desired solid or semi-solid media may be employed. The media is generally sold in such a petri dish, but may be prepared and added to an empty, sterile petri dish prior to testing. Cover element 13 contains a plurality of integral downwardly disposed disc retaining members 14 which may be of any suitable design. The cylindrical posts shown as disc retaining members are generally spaced on equidistant centers at least 24 mm. apart when used for sensitivity testing. Each element may be constructed of any suitable material such as glass, plastic, etc.; disposable optically clear materials such as polystyrene are usually preferred. If desired, either the lid, cover element, or both may have one or more concentric measuring rings 15 marked thereon at a point along the same radius as the disc location to aid in measuring the extent of inhibition zones. The inner ring being the diameter of a disc, inhibition zones around each disc may be easily and accurately measured by rotating the lid so that the rings are centered over a disc and reading the measurement directly. The lid, cover element, or both conveniently include a small section of roughened surface 16 to accept pencil or crayon marking for identification purposes, and may be color-coded to indicate their contents. Reagent discs are shown at 17.

Figure 2:
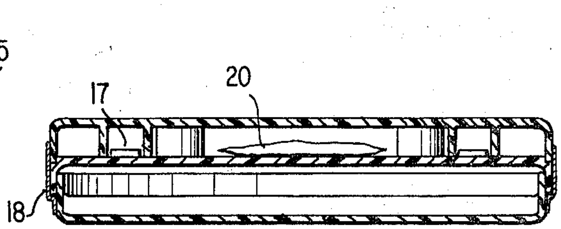
FIG. 2 is a cross-sectional view of the cover element of the invention fitted atop a closed petri dish.
Figure 4:
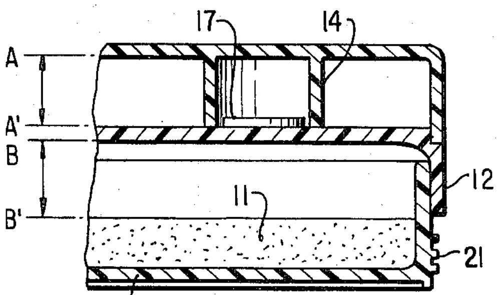
FIG. 4 is a detail of FIG. 2 showing a reagent disc being held in place.

Referring now to FIGS. 2 and 4, the assembled combination may contain a desiccant 20 to minimize water condensation therein. Bottom plate 10 is conveniently provided with a roughened or grooved portion 21 along the lower side thereof to provide a gripping surface. The distance A–A′ from the inside of the cover element to the outside of the lid top is preferably slightly less than the distance B–B′ from inside the lid top to the gel surface to allow closely controlled placement of the discs and embedding of the discs into the gel surface without damage to the gel. Disc retaining members 14 extend sufficently downward to prevent the disc 17 from sliding out of position, and preferably touch the top of the lid. Suitable sealing means 18, such as tape, adhesive, or polymeric film may be provided around the edges to hold the elements together and maintain sterility.

Figure 3:
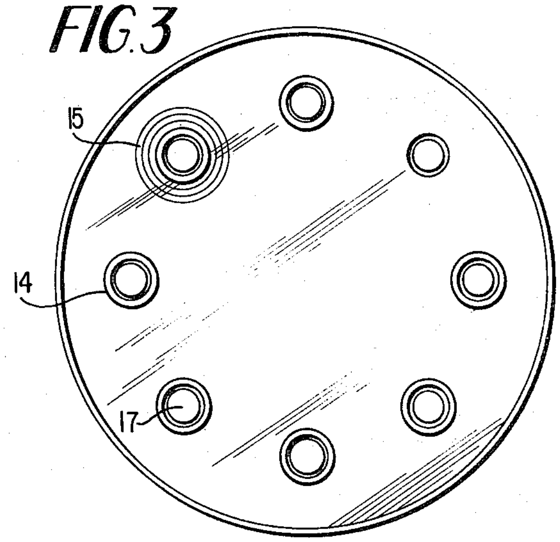
FIG. 3 is a top view of the cover element.

FIG. 3 shows a typical arrangement of the disc retaining members for depositing a pattern of 8 equidistant reagent discs onto a single plate. Other numbers and arrangements of the disc retaining members are, of course, possible to provide different discs deposition patterns, preferably adhering to the recommended standard spacing for the particular test technique to be used. In microbiological sensitivity testing, the recommended standard minimum spacing will be 24 mm. on center.

Figure 5:
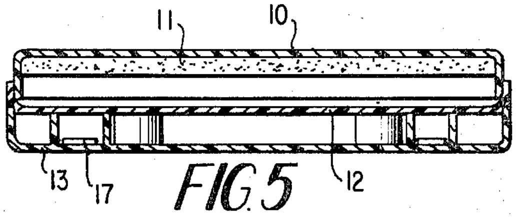
FIG. 5 shows the lid removed preparatory to depositing the reagent discs.

FIG. 5 shows one illustrative assembly of the cover element and media-containing petri dish in inverted position for incubation. The discs are securely held in place in this position by the walls of the disc retaining members integrally protruding from the flat surface thereof. The desiccant 20 has been removed preparatory to testing, and will generally be kept in place until just prior to use to avoid the adverse effects of moisture on reagents contained in the discs.

Figure 6:
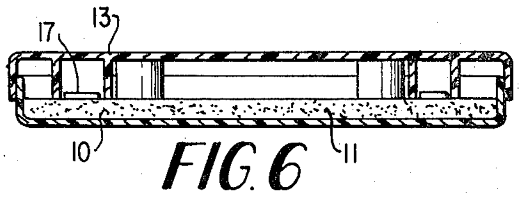
FIG. 6 shows the reagent discs resting on the gel surface after inversion.
Figure 7:
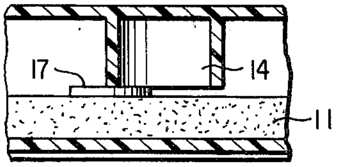
FIG. 7 is a detailed cross-sectional view of a reagent disc being embedded into the gel surface.
Figure 9:
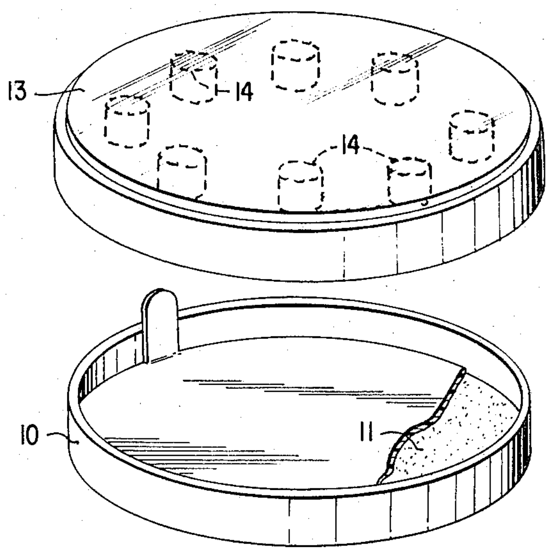

In FIG. 6, the discs have been accurately deposited onto the media surface by removing the intermediate separating structure, such as the petri dish lid shown in FIG. 5 or the water impermeable membrane shown in FIG. 9, and inverting the cover element to allow the discs to fall into place. If the cover element has been kept dry until immediately prior to use, the discs usually fall readily into place. If one or more discs fail to fall into position, which may happen if the cover element is not dry, a slight tapping of the top of the cover element in the position shown will dislodge the reagent discs and deposit them on the gel surface.

Prior to inversion for incubation, the discs may be firmly affixed to the gel surface by lifting the cover element, rotating it slightly to line up a projecting disc retaining member with a deposited disc, and setting the cover element down. In a preferred embodiment, the distance A–A′ is slightly less than the distance B–B′ (see FIG. 4) so that the gel surface is not damaged by forcing the disc into it during this operation.

Figure 8:
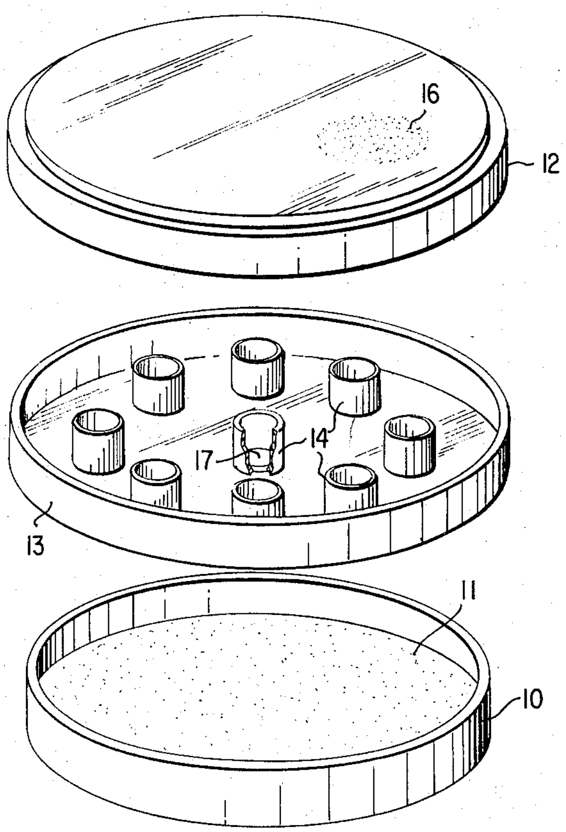
FIGS. 8 and 9 show alternate methods of packaging the cover element with a suitable media plate.

FIGS. 8 and 9 show two alternate methods of packaging the cover element of this invention with a media-filled petri dish. In FIG. 8, the cover element is merely inserted over a petri dish base between it and the petri dish lid.

In FIG. 9, a water impermeable membrane separates the cover element prior to use from the media surface, and is preferably provided with a projecting tab to aid in removal of the membrane. Numerous other packaging arrangements may be used, as will be apparent to those skilled in the art.

It will be appreciated that while the foregoing disclosure relates only to a preferred embodiment of the invention in depositing the reagent discs of antibacterial agents onto gel media surfaces, it is capable of depositing many organic and inorganic materials in different form of the same onto various receiving surfaces. Furthermore, it should be understood that the invention can be used to deposit a variety of movable members onto receiving devices of various types, and thus numerous modifications or alterations may be made without departing from the spirit and scope of the invention as set forth in the appended claims.

I claim:

1. An article of manufacture suitable for use both as a cover for a gel-containing receptacle dish and as a dispenser for applying reagent-impregnated discs in a predetermined pattern onto the surface of said gel, which comprises in combination:

(a) a solid lid suitable for use with a corresponding gel-containing receptacle dish, said lid having an integrally formed peripheral flange on an inner side thereof and plurality of hollow cylindrical members of an inner diameter sufficiently large to loosely enclose a reagent-impregnated disc therein, said cylindrical members integrally depending from the inner surface of said lid in the same direction as said flange and being open at the distal ends thereof, said distal ends extending approximately to the gel surface in said gel-containing receptacle when said article is placed as a cover over said receptacle;

(b) removable discs retaining means extending across the open distal ends of said cylindrical members to prevent said discs from moving therethru, thereby keeping said discs out of contact with said gel surface prior to use; and (c) reagent impregnated discs loosely enclosed within an enclosure formed by said cylindrical members, the surface of said lid and said disc retaining means, such that said discs are capable of moving by gravity thru the distal end of said cylindrical members upon removal of said disc retaining means.

2. An article according to claim 1, wherein said reagent impregnated discs are antibiotic sensitivity discs.

3. An article according to claim 1, further comprising a desiccant located between said lid and said spacing means.

4. The combination cover element and disc dispenser of claim 1, wherein said lid is circular for use with a corresponding petri dish base.

5. The combination cover element and the disc dispenser of claim 1 having a plurality of cylindrical members, the centers of which are spaced at least 24 mm. apart.

6. The combination cover element and disc dispenser of claim 1 in combination with a corresponding receptacle dish.

7. An article according to claim 6, wherein said receptacle dish is provided with a roughened or grooved portion along the lower side thereof to provide a gripping surface.

8. The combination cover element and disc dispensr of claim 6, in further combination with a conventional lid for said receptacle dish, said combination cover element and disc dispenser being assembled between said lid and said receptacle dish, and having sealing means around the perimeter thereof to hold said combination in position.

9. The combination cover element and disc dispenser of claim 6, in further combination with a conventional lid for said receptacle dish, said combination cover element and disc dispenser being assembled atop said lid and projecting downwardly towards the top of the lid.

10. The combination cover element and disc dispenser of claim 6, in further combination with a solid or semisolid medium contained in the receptacle dish.

11. The combination cover element and disc dispenser of claim 10, wherein said media is Blood Agar, Eugonagar, Trypticase Soy Agar, or Mueller-Hinton Agar.

12. A method of depositing reagent impregnated discs from a dispenser as defined by claim 1 onto a medium surface, which comprises removing the spacing means from said dispenser, placing a corresponding gel-containing receptacle dish over said dispenser and inverting the cover element and corresponding gel-containing receptacle dish to allow the discs to fall into place.

13. A method according to claim 12, further comprising firmly affixing the deposited discs to the gel surface by lifting the cover element, rotating it slightly to line up a projecting disc retaining member with a deposited disc, and setting the cover element down.

14. A method according to claim 1, further including removing the cover element and replacing said cover element with a standard receptacle dish cover.

References Cited

UNITED STATES PATENTS

| | | | |
|---|---|---|---|
| 2,871,168 | 1/1959 | Salisbury | 195—139 |
| 2,533,089 | 12/1950 | Brewer et al. | 195—139 |
| Re. 24,557 | 10/1958 | Scherr | 195—139 |
| 3,480,400 | 11/1969 | Csizmas et al. | 23—253 |
| 3,073,750 | 1/1963 | Greenblatt | 195—139 |
| 2,947,444 | 8/1960 | Taylor et al. | 221—93 |

A. LOUIS MONACELL, Primary Examiner

R. M. ELLIOTT, Assistant Examiner

UNITED STATES PATENT OFFICE
CERTIFICATE OF CORRECTION

Patent No. 3,776,818 Dated December 4, 1973

Inventor(s) W. N. KHAN

It is certified that error appears in the above-identified patent and that said Letters Patent are hereby corrected as shown below:

Claim 1, first line of "(b)": Change "discs" to --disc--.

Claim 14, line 1: change "claim 1" to --Claim 12--.

Signed and sealed this 13th day of August 1974.

(SEAL)
Attest:

McCOY M. GIBSON, JR.
Attesting Officer

C. MARSHALL DANN
Commissioner of Patents